July 3, 1962 — R. C. GSCHWIND — 3,042,339
SUSPENSION SAFETY-DEVICE
Filed Oct. 6, 1959 — 3 Sheets-Sheet 1
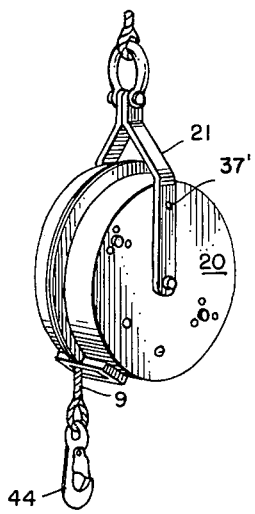
FIG. I
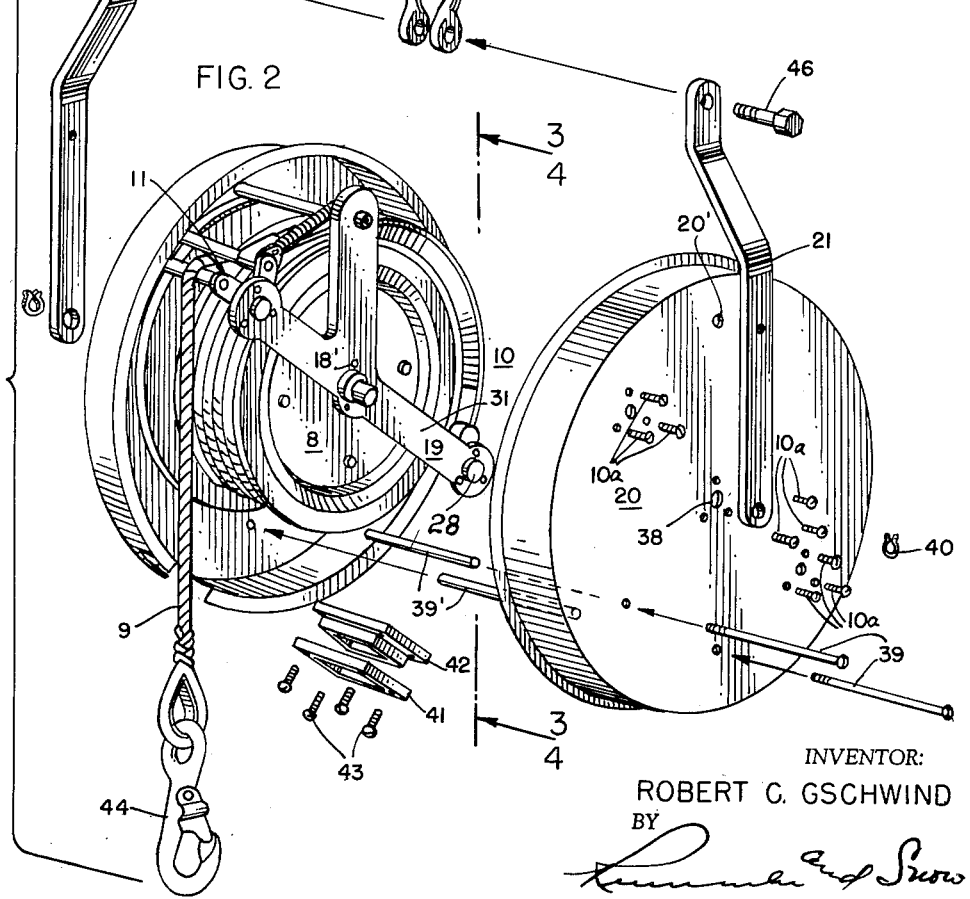
FIG. 2
INVENTOR:
ROBERT C. GSCHWIND
BY
ATT'YS

INVENTOR:
ROBERT C. GSCHWIND
BY
ATT'YS

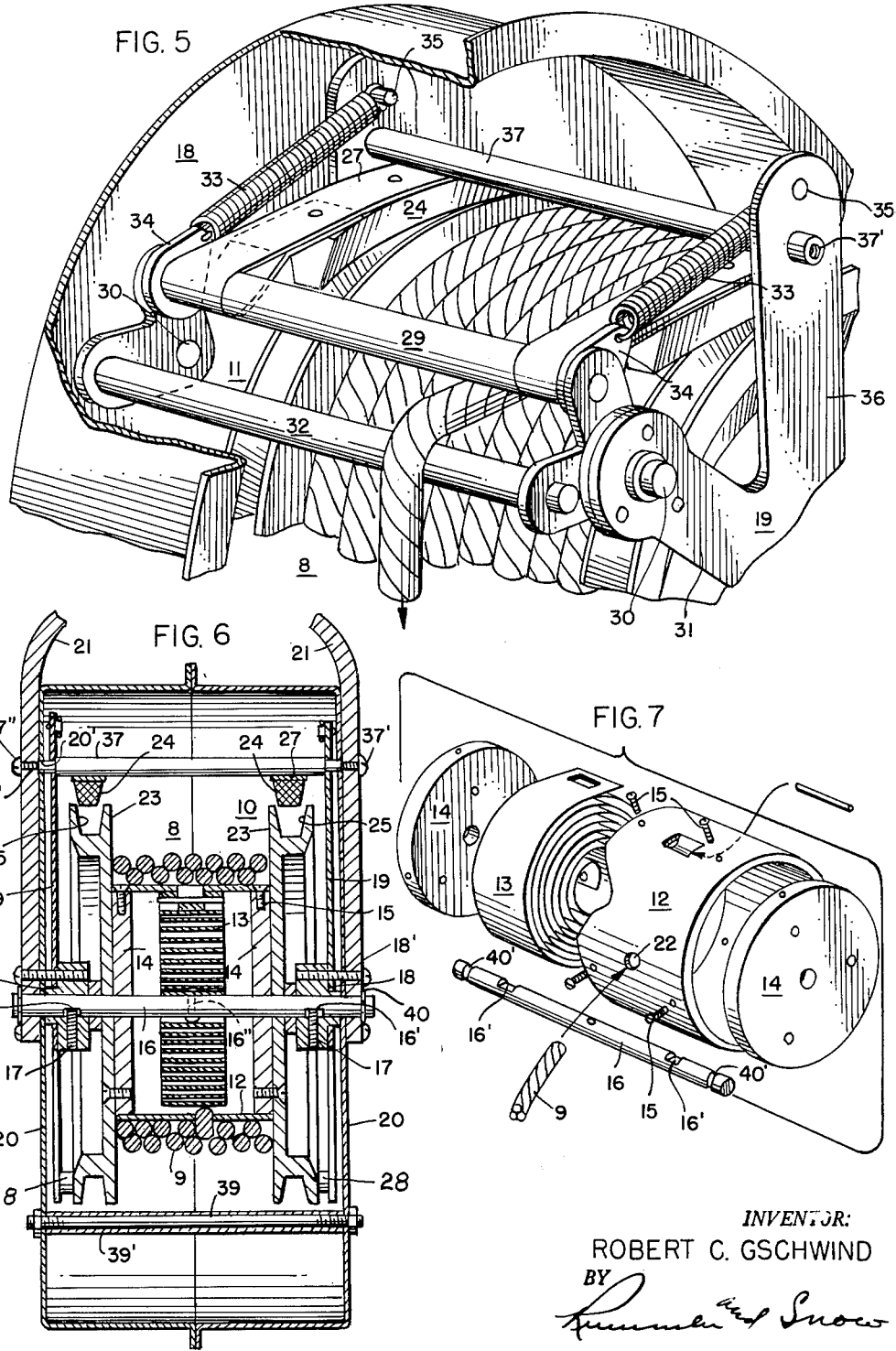

United States Patent Office 3,042,339
Patented July 3, 1962

3,042,339
SUSPENSION SAFETY-DEVICE
Robert C. Gschwind, 6957 N. Caldwell Ave., Chicago, Ill.
Filed Oct. 6, 1959, Ser. No. 844,828
2 Claims. (Cl. 242—107.4)

This invention relates to improvements in portable safety devices for persons who have to be suspended for operations at considerable distance above the ground.

In the absence of adequate safety-devices, workmen operating high above the ground, such as window washing, building surfacing on vertically-adjustable scaffolding, interior of large vats, and conditioning tall chimneys and the like, are subject to possible sudden break in the suspension lines that might catapult them to the ground, resulting in serious injury or death.

The main objects of this invention are to provide an improved form of safety device for use by workmen suspended from extreme heights above the ground; to provide an improved safety device of this kind in which a sudden strain on the safety cable will prevent any further pay-out of the cable until the strain thereon can be released; to provide an improved safety device of this kind wherein a sudden strain on the safety cable shifts a normally-retracted brake into engagement with a spring-recoil mechanism; and to provide an improved safety device of this kind of such simple construction as to make the manufacture thereof economical, the associated use with any kind of suspension means facile, and the operation positive in any kind of situation.

One specific embodiment of this invention is shown in the accompanying drawings, in which:

FIGURE 1 is a perspective view of an improved safety device constructed in accordance with this invention;

FIG. 2 is an enlarged, partially-exploded, perspective of this improved form of safety device;

Figure 4:
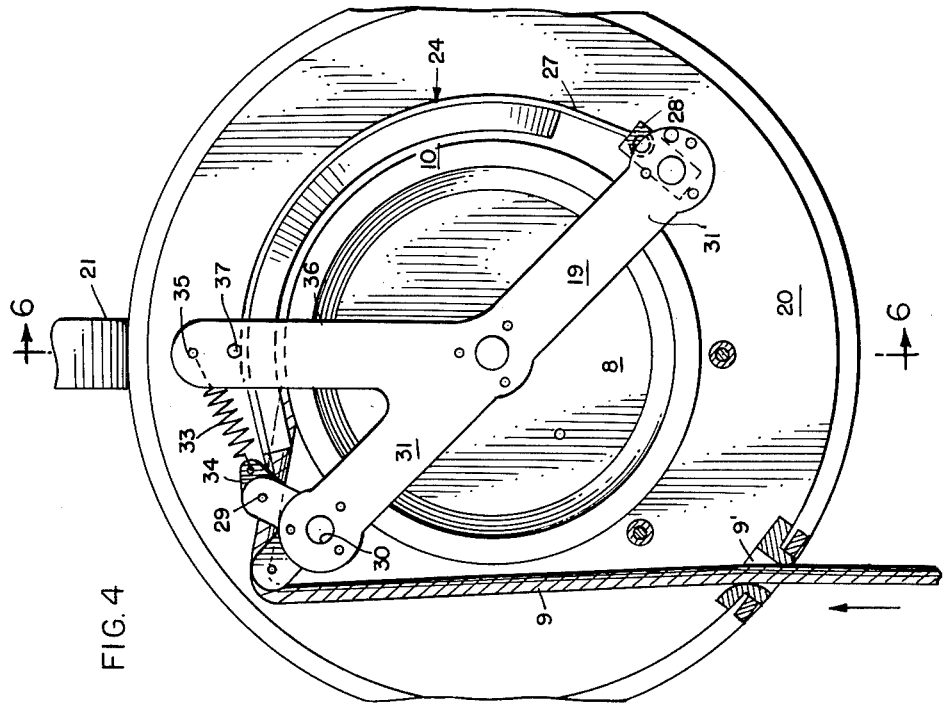
Figure 3:
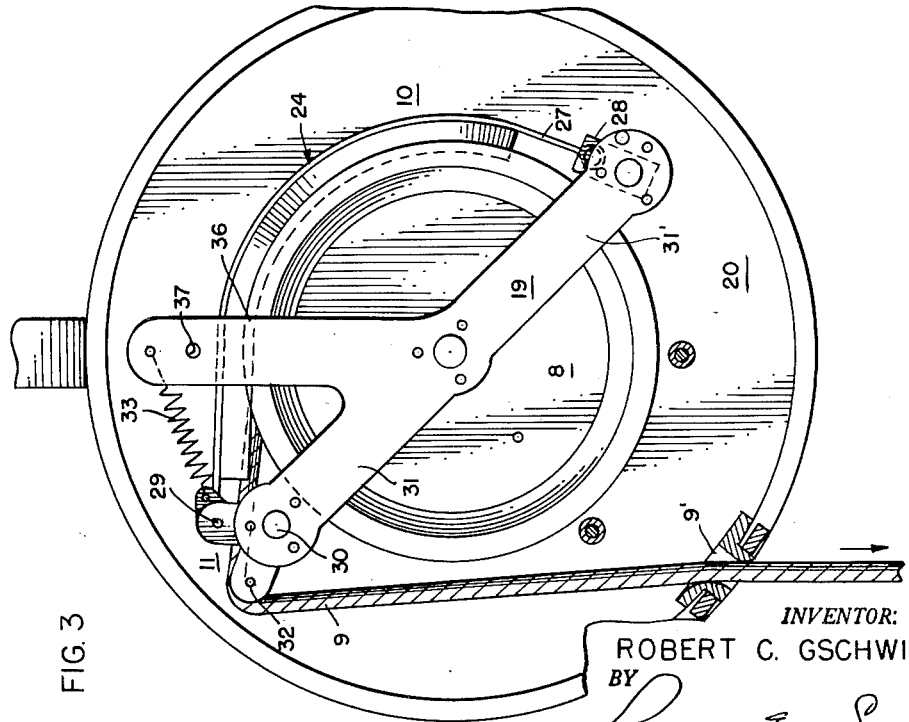

FIGS. 3 and 4 are enlarged, side views taken on the plane of the lines 3—3 and 4—4 respectively of FIG. 2 showing the brake means in contact and retracted positions respectively, with the cables paying out and rewinding also respectively.

FIG. 5 is a further enlarged, fragmentary, perspective view of my invention;

FIG. 6 is a sectional view taken on the plane of the line 6—6 of FIG. 4; and

FIG. 7 is an exploded perspective of the spring-recoil mechanism for the safety-cable.

The essential concept of this invention involves a spring-recoil cylinder having brake-shoe surfaces engageable by normally-retracted brake shoes which becomes actuated by a sudden strain on the safety cable to prevent further pay-out thereof.

A safety device embodying the foregoing concept comprises a spring-recoil mechanism 8 (see FIG. 7) for a safety cable 9 and with which mechanism is associated a brake means 10 actuated by a cable-controlled trip-lever 11.

The spring-recoil mechanism 8 is of more or less conventional contruction in which a cylindrical housing 12 enclosing a coiled spring 13, is secured to end walls 14 by screws 15. The end walls 14 journal the housing 12 on a shaft 16 for rotation thereabout. The shaft 16 is keyed against rotation by set screws 17 which are threaded in hubs 18 with the inner end of the set screw 17 seating on the seat 16' of the shaft 16. A pair of Y-shaped members 19 are each secured to the hub 18 one on each side of the housing 12 by screws 18'. (FIG. 6). Such an assembly is enclosed in a housing 20 suspended from a yoke 21 (FIGS. 1 and 2).

The spring 13 is secured at one end to the shaft 16 by a rivet, bolt or screw 16" and at the other end to the cylindrical housing 12 by a pin 13'. The end of the cable 9 extends through the aperture 22 in the cylinder 12 and is knotted or otherwise keyed inside the cylinder 12 to insure its connection thereto even in the extreme condition of the entire cable being payed out.

The brake means 10 comprises a pair of grooved disks 23 and a pair of brake shoes 24. As most clearly shown in FIG. 6 the disks 23 are considerably larger in diameter than the cylindrical housing 12 so that the brake grooves 25 extend beyond the periphery of the maximum coil of the cable 9 as it is wound around the cylinder 12.

The brake shoes 24, as here shown, are in the form of friction pads secured to the concave side of arcuate leaf-springs 27 secured at one end to trunnions 28 on the ends of the stem parts of the respective Y-members 19 and at the opposite ends to a rod 29 on the trip lever 11.

The trip lever 11 comprises a pair of V-shaped elements hinged at their apexes by trunnions 30 on the ends of the branches 31 of the Y-members 19. The ends of the shorter arms of these V-shaped elements are spanned by and connected to the rod 29 whereas the ends of the longer of the arms of these V-shaped elements are spanned by and connected to a rod 32. Springs 33, connected to small plates 34, which plates are rotatable on the rod 29 and to pins 35 on the ends of the branches 36 of the Y-members 19, retract the trip lever 11, as shown in FIG. 5. A rod 37 spans and is connected to the upper ends of the Y-member branch 36 and limits the retractive movement of the brake shoes 24. Also it will be noted from the FIG. 6 the distal ends of rod 37 extends beyond the members 36 to seat in apertures 20' of the housing 20. It is noted that the distal ends of rod 37 are axially drilled and tapped as at 37' to receive bolts 37" which extend through the aligned apertures 21' in the yoke 21.

The cable 9 travels over the rod 32 in its pay-out from and recoiling on the cylinder 12 so that a sudden strain on the cable below the trip lever 11 draws the brake shoes 24 into engagement with the brake disks 23, by rotation of the trip lever 11 counterclockwise about pivot 30. This locks the recoil mechanism 8 against any further pay-out of the cable 9, so long as a strain continues on the cable.

The housing 20 here is shown as formed of two similarly-shaped dish-like parts each with a central opening 38 (FIG. 2) for the ends of the shaft 16. The two parts of the housing 20 are secured in abutting relationship around the spring recoil mechanism 8, the brake means 10, and the trip lever 11 by bolts 39 extending through tubular spacers 39' (FIG. 2). The assembled device is suspended from the yoke 21 seated over the protruding ends of the shaft 16 and held in place by the spring keys 40 (FIG. 2) seating in grooves 40'. As will be obvious from FIG. 2, bolts 10a are inserted in apertures in the housing 20 and threaded in cooperating female threaded apertures in the distal ends of parts 31 and 31' whereby the Y members 19 are fixed to the housing 10. Apertured plates 41 and 42 are secured by screws 43 to the housing 20 to form a substantially friction-free opening 9' for the cable 9. (FIGS. 3 and 4.)

This safety device is used as an accessory to the main equipment whereby men are suspended for working at considerable heights above the ground. The yoke 21 is secured at its upper end by a clevis 45 and bolt 46. A cable is normally secured at one end to the clevis 45 and the other end to a conventional large hook (not shown) and the hook is fastened to some part of the structure being worked on, at a point above the work location. The snap hook 44 is attached to a harness on the workman. As long as the workman is making normal movements in his task, the cable 9 pays out and recedes under the gradual pull on the cable and release of strain thereon, respectively.

In the event some part of the normal suspension equipment breaks or a workman falters so as to create a sudden jerk on the cable 9, the strain on the cable depresses the rod 32 and swings the V-shaped trip lever 11 to snap the brake shoes 24 into the grooves on the brake disks 23 and thereby prevent any further payout of the cable 9. So long as the tension, which caused the jerk on the cable, continues the set of the brake means 10 will remain and prevent any further pay-out of the cable from the spring recoil mechanism 8. However, as soon as that strain is released the springs 33 will retract the brake means 10 and permit the spring recoil mechanism 8 to take up the slack on the cable 9. Experiments have shown that the device is placed in operative braking relationship substantially simultaneously with the sudden weight being exerted. This means only about one inch movement of the cable 9 before braking is effected.

Although but one specific embodiment of this invention is herein shown and described it will be understood that details of the construction shown may be altered or omitted without departing from the spirit of the invention as defined by the following claims.

I claim:

1. A workman's safety-suspension device comprising, a support, means for suspending the support above a workman, a spring-recoil drum journaled on the support, a coiled cable having one end attached to the drum and leading exteriorly of the support, a pair of axially-spaced grooved brake-shoe disks integrated with the drum, a pair of Y-shaped members fixed on the support with the axis of the drum adjacent the crotch of the members and the free ends of the members all extending outwardly of the periphery of the brake-shoe disks, trunnions connected to the ends of the stem part of the Y-shaped members, a pair of arcuate-shaped leaf springs each secured at one end to the trunnions on the stem ends of the Y-shaped member, brake shoes fixed on the inner surfaces of the leaf springs for engagement with the brake-shoe disks, a pair of V-shaped levers fulcrumed at their respective crotches to the free ends of one of the arms of the Y-members, rods spanning and connected to the respective free ends of the V-shaped levers, means connecting one of the rods on the V-shaped levers with the other ends of the leaf springs and positioning the leaf springs substantially concentrically of the brake-shoe disks, springs connecting the V-shaped levers with the support and maintaining the brake shoes retracted from contact with the brake-shoe disks to permit the pay-out and the take-in of the cable over the other rod during the normal movements of a workman, said springs being de-activated by a sudden strain on the cable caused by other than a normal movement of a workman, whereby the V-shaped levers are shifted to engage the brake-shoes with the brake-shoe disks and retain the drum against further movement until the other-than-normal strain on the cable is released.

2. A workman's safety-suspension device comprising, a support, means for suspending the support above the workman, a spring-recoil drum journaled on the support, a cable secured at one end to the drum and coiled thereon, means on the other end of the cable for attachment to a workman, a pair of axially-spaced grooved brake-shoe disks integrated with the drum, a pair of arcuate-shaped leaf springs each secured at one end to the support and each mounting a brake-shoe adapted for engagement with the respective brake-shoe disks, a pair of V-shaped levers fulcrumed on the support in axially-spaced relationship outwardly of the periphery of the brake-shoe disks with the angles of the levers facing outwardly from the drum, rods spanning and secured to the respective ends of the V-shaped levers one of which rods has the cable traveling thereover and the other of which rods is connected to the other ends of the brake-shoe leaf springs, and yielding means connected to the support and to the other rod and normally maintaining the brake-shoes out of contact with the brake-shoe drum-surfaces to permit travel of the cable over the other rod during pay-out and take-in of the cable from and to the drum caused by all normal movements of the workman, the yielding means being adapted for activation only by a sudden strain on the cable caused by other-than-normal movements of the workman to retain the drum against any movement until the more-than-normal strain on the cable is released.

References Cited in the file of this patent

UNITED STATES PATENTS

| 635,524 | Terdoest | Oct. 24, 1899 |
| 991,768 | Busat | May 9, 1911 |
| 1,164,489 | Fornelius | Dec. 14, 1915 |
| 1,301,497 | Pfeil | Apr. 22, 1919 |
| 1,513,061 | Muth | Oct. 28, 1924 |
| 1,625,221 | Nykolyshak | Apr. 19, 1927 |
| 2,729,425 | Gschwind | Jan. 3, 1956 |
| 2,896,912 | Faugier et al. | July 28, 1959 |

FOREIGN PATENTS

| 18,263 | Australia | Nov. 10, 1904 |